United States Patent Office 3,474,102
Patented Oct. 21, 1969

3,474,102
SUBSTITUTED 7 - (2 - FORMYL-1-ALKOXYVINYL)-7,8-DIHYDRO-6-(HYDROXY OR METHOXY)-6,14-ENDO (ETHENO OR ETHANO) CODIDES AND MORPHIDES
John Johnston Brown, Pearl River, N.Y., and Robert Allis Hardy, Jr., Ridgewood, N.J., assignors to American Cyanamid Company, Stamford, Conn., a corporation of Maine
No Drawing. Filed Dec. 8, 1967, Ser. No. 688,963
Int. Cl. C07d 43/32, 43/00
U.S. Cl. 260—285
10 Claims

ABSTRACT OF THE DISCLOSURE

This disclosure describes compounds of the class of substituted 7 - (2 - formyl - 1 - alkoxyvinyl) - 7,8 - dihydro - 6 - (hydroxy or methoxy)-6,14-endo(etheno or ethano)codides and morphides useful as intermediates in the synthesis of substituted 7-acryloyl-7,8-dihydro-6-(hydroxy or methoxy)-6,14-endo(etheno or ethano)codides and morphides which possess analgesic activity.

BRIEF SUMMARY OF THE INVENTION

This invention relates to novel substituted 7-(2-formyl-1 - alkoxyvinyl) - 7,8 - dihydro-6-(hydroxy or methoxy)-6,14-endo(etheno or ethano)codides and morphides and to methods of preparing these compounds. The novel compounds of the present invention may be represented by the following general formula:

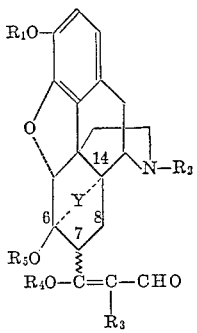

(I)

wherein $R_1$ is hydrogen, lower alkyl or lower alkanoyl; $R_2$ is hydrogen, cyano, propargyl, lower alkyl, phenyl lower alkyl, lower alkenyl or lower cycloalkylmethyl; $R_3$ is hydrogen or alkyl of from 1 to 7 carbon atoms; $R_4$ is lower alkyl; $R_5$ is hydrogen or methyl; and Y is etheno or ethano. Suitable lower alkyl and lower alkanoyl groups contemplated by the present invention are those having from 1 to 4 carbon atoms such as methyl, ethyl, isopropyl, n-butyl, formyl, acetyl, propionyl, isobutyryl, etc. Typical alkyl groups of from 1 to 7 carbon atoms are, for example, methyl, ethyl, n-propyl, n-butyl, isoamyl, sec.-hexyl, n-heptyl, etc. Suitable lower alkenyl groups are those having up to about 6 carbon atoms such as, for example, allyl, methallyl, dimethallyl, and the like. Suitable lower cycloalkylmethyl groups are those having from 4 to 7 carbon atoms such as cyclopropylmethyl, cyclobutylmethyl, cyclopentylmethyl, etc. Phenyl lower alkyl is exemplified by benzyl, α-phenylethyl, β-phenylethyl, and the like.

DETAILED DESCRIPTION OF THE INVENTION

The novel compounds of the present invention are generally obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form acid-addition salts with a variety of organic and inorganic salt-forming agents. Thus, acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium of the organic free bases when $R_1$ in the above general formula is hydrogen. For purposes of this invention, the organic free bases are equivalent to their acid-addition salts and their alkali metal salts.

The novel substituted 7-(2-formyl-1-alkoxyvinyl)-7,8-dihydro-6-(hydroxy or methoxy) - 6,14 - endo(etheno or ethano)-codides and morphides (I) of the present invention may be readily prepared from an appropriately substituted 7 - (1-alkoxy-1-alken-1-yl)-7,8-dihydro-6-(hydroxy or methoxy)-6,14-endo(etheno or ethano)codide or morphide in accordance with the following reaction scheme:

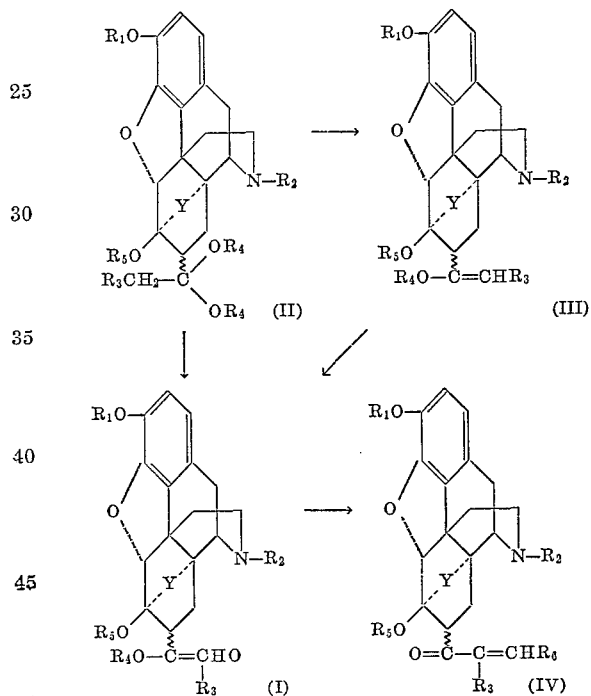

wherein $R_1$, $R_2$, $R_3$, $R_4$, $R_5$ and Y are as previously defined and $R_6$ is phenyl, lower alkyl, phenyl lower alkyl or lower alkenyl. By this procedure, a 7-[di(lower alkoxy)methyl] derivative (II), prepared as described in our copending application Ser. No. 671,128, filed Sept. 27, 1967, is treated with a formylating agent followed by hydrolysis and the products of this invention (I) are isolated directly. Alternatively, a suitably substituted 7-(1-alkoxy-1-alken-1-yl) derivative (III), prepared as described in our copending application Ser. No. 671,106, filed Sept. 27, 1967, may be converted to the products of this invention (I) by formylation and hydrolysis. By this route, the 7-(1-alkoxy-1-alken-1-yl) derivatives are considered to be intermediates which may be isolated and purified or which may be prepared "in situ" and formylated without isolation or purification depending upon the circumstances.

The formylating reagent is prepared by treating a substituted formamide such as N,N-dimethylformamide, N,N-diethylformamide, N-formylpiperidine, N-formylmorpholine, N-methylformanilide, and the like, with phosgene, phosphoryl chloride or thionyl chloride in an inert solvent such as methylene chloride, ethylene chloride or chloroform. Alternatively, an excess of the substituted formamide may be used as the solvent. The formylation reaction (II→I or III→I) is also most conveniently carried out in an inert solvent such as methylene chloride, ethylene chloride, chloroform, or an excess of the substituted formamide employed to prepare the formylating reagent. The temperature range for the formylation reaction is from about 0° C. to about 35° C. although room temperature is preferred. The hydrolysis step may be carried out with dilute acid or dilute alkali but preferably with aqueous sodium acetate. When the formylation reaction is substantially complete (usually from several minutes to several hours or more), the reaction mixture is stirred with aqueous sodium acetate for from several minutes to several hours at room temperature and the product is isolated.

The above described formylation reaction may be considered to be effected via a formylating reagent such as that shown by compound (V), the formylating reagent formed from N,N-dimethylformamide and phosgene. This formylating

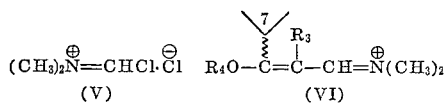

reagent then reacts with the ketal (II) or enol-ether (III) to form an iminium intermediate (VI) (partial structure only shown) which is converted by hydrolysis to the novel compounds of the present invention (I).

The novel compounds of the present invention (I) are valuable intermediates for the preparation of the corresponding substituted 7-acryloyl-7,8-dihydro-6-(hydroxy or methoxy)-6,14-endo(etheno or ethano)codides and morphides (IV) as is illustrated in the reaction scheme set forth hereinabove. This conversion may be readily carried out by treating a compound of the present invention (I) with a Grignard reagent prepared from the appropriate halide $R_6X$, where $R_6$ is as previously defined and X is halogen. Other organo-metal reagents such as methyl lithium, phenyl lithium, and the like ($R_6$-Li) are also useful for this conversion. This reaction may be readily carried out in a solvent such as diethyl ether at a temperature of from about 0° C. to about 80° C. over a period of time of from about 15 minutes to about 3 hours or more, when the reaction is substantially complete. Decomposition of the organo-metal complex, using standard procedures well known to the art, then produces an intermediate secondary alcohol (VII) (partial structure only

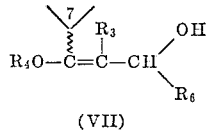

shown) which is immediately converted to the corresponding 7-acryloyl derivative (IV) upon treatment with dilute aqueous acid for a few minutes at room temperature.

The substituted 7-acryloyl-7,8-dihydro-6-(hydroxy or methoxy)-6,14-endo(etheno or ethano)codides and morphides (IV) are active analgesics when measured by the "writhing syndrome" test for analgesic activity as described by Siegmund et al., Proc. Soc. Exptl. Biol. Med., vol. 95, p. 729 (1957) with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, and merely by way of illustration, 7α-crotonoyl-6,7,8,14-tetrahydro - 6,14 - endoethenothebaine, 7α-(2 - pentenoyl)-6,7,8,14-tetrahydro-6,14-endoethenothebaine and 7α-(2-hexenoyl) - 6,7,8,14 - tetrahydro - 6,14 - endoethenothebaine all showed analgesic activity when tested by this procedure at an oral dose of 25 mg./kg. of body weight.

The novel compounds of the present invention may exist in several isomeric forms such as stereoisomers. It is to be understood that the present invention includes within its scope all such isomeric forms. For example, the codides used as starting materials have several asymmetric carbon atoms, and epimers at the C–7 asymmetric center are possible. Formation of stereoisomers, or epimers, at C–7 is therefore possible in the products of this invention. The nuclear magnetic resonance spectra of these 7α- and 7β-(2-formyl-1-alkoxyvinyl)-7,8-dihydro-6-(hydroxy or methoxy)-6,14-endo(etheno or ethano)codides and morphides are particularly helpful in characterizing the mixtures of epimers or the substantially pure stereoisomers as obtained from the reaction mixtures or from subsequent purifications and separations. These isomers may then be separated by methods (such as fractional crystallization and partition-chromatography) well known to those skilled in the art. In addition, cis-trans isomers are possible at the C–19, 20 double bond. All such stereoisomeric forms of the 7-(2-formyl-1-alkoxyvinyl)-7,8-dihydro-6-(hydroxy or methoxy)-6,14-endo(etheno or ethano)codides and morphides are, therefore, included within the purview of the present invention.

In accordance with accepted convention, an α-substituent at the 7-position is behind the plane of the paper whereas a β-substituent at the 7-position is in front of the plane of the paper. This is usually represented by a - - - - bond for an α-substituent, a — bond for a β-substituent, and a $\sim$ bond where both are indicated.

The invention will be described in greater detail in conjunction with the following specific examples.

EXAMPLE 1

Preparation of 7α-(2-formyl-1-methoxyvinyl)-6,7,8,14-tetrahydro-6,14-endoethenothebaine A solution of phosgene (2 g.) in methylene chloride (200 ml.) is added rapidly dropwise with stirring to a mixture of dimethyl formamide (200 ml.; dried over molecular sieves) and methylene chloride (600 ml.). The mixture is stirred or a further 15 minutes after the addition is complete. A solution of 7α-(1,1-dimethoxyethyl)-6,7,8,14-tetrahydro-6,14-endoethenothebaine (19.4 g.) in methylene chloride (200 ml.) and pyridine (10 ml.) is then added in a slow stream and the mixture is stirred for 45 minutes. Aqueous sodium acetate (1,200 ml.; 5%) is then added and the mixture is stirred vigorously for 30 minutes. If necessary, the mixture is adjusted to pH 8 by the addition of aqueous sodium bicarbonate and the layers are separated. The aqueous layer is washed with methylene chloride and is then made strongly alkaline with sodium hydroxide solution (10%). The mixture is extracted with ether and the extract is washed with water and dried. Evaporation of solvent followed by crystallization of the residue from acetone-n-hexane gives 7α-(2-formyl-1-methoxyvinyl)-6,7,8,14-tetrahydro-6,14-endoethenothebaine (15.37 g.), M.P. 152–153° C. A further amount (1.42 g.), M.P. 150–152° C., is obtained from the mother liquor to give a total yield of 87%.

EXAMPLE 2

Preparation of 7α-crotonoyl-6,7,8,14-tetrahydro-6,14-endoethenothebaine

Lithium (100 mg.) is added in small pieces to a stirred suspension of 7α-(2-formyl-1-methoxyvinyl)-6,7,8,14-tetrahydro-6,14-endoethenothebaine (1 g.) in diethyl ether (20 ml.) and methyl iodide (5 ml.). After 30 minutes the lithium has all reacted, and water is added. The layers are separated, and the organic layer is washed with water, dried over anhydrous sodium sulfate, and evaporated. The residue is dissolved in dilute hydrochloric acid (5%) and, after several minutes, the solution is neutralized with saturated aqueous sodium bicarbonate solution. The mixture is extracted with methylene chloride and the extract is washed with water, dried over anhydrous sodium sulfate, and evaporated. A solution of the residue in methylene chloride is passed through a short column of Magnesol® and evaporation of the eluate followed by crystallization of the residue from acetone-n-hexane gives 7α-crotonoyl - 6,7,8,14 - tetrahydro-6,14-endoethenothebaine (770 mg.), M.P., 107–110° C.

EXAMPLE 3

Preparation of 7α-(2-pentenoyl)-6,7,8,14-tetrahydro-6,14-endoethenothebaine

By a similar process to that in Example 2, 7α-(2-formyl - 1 - methoxyvinyl) - 6,7,8,14 - tetrahydro-6,14-endoethenothebaine is treated with ethyl lithium (from lithium and ethyl bromide) in ether. The reaction mixture is worked up as previously described, and the crude residue is treated with dilute hydrochloric acid to give 7α-(2-pentenoyl) - 6,7,8,14 - tetrahydro - 6,14 - endoethenothebaine, M.P. 103–105° C. after purification and crystallization from hexane.

EXAMPLE 4

Preparation of 7α-(2-hexenoyl)-6,7,8,14-tetrahydro-6,14-endoethenothebaine

By a similar process to that in Example 2, 7α-(2-formyl - 1 - methoxyvinyl) - 6,7,8,14 - tetrahydro-6,14-endothenothebaine is treated with propyl lithium (from lithium and propyl bromide) in ether. The reaction mixture is worked up as previously described, and the crude residue is treated with dilute hydrochloric acid, to give 7α-(2-hexenoyl)6,7,8,14-tetrahydro - 6,14 - endoethenothebaine, M.P. 65–69° C., after purification and crystallization from petroleum ether.

EXAMPLE 5

Preparation of N-cyclopropylmethyl - 7α - (2-formyl-1-methoxyvinyl) - 6,7,8,14 - tetrahydro - 6,14 - endoethenonorthebaine hydrochloride A solution of phosgene (1 g.) in methylene chloride (10 ml.) is added rapidly dropwise with stirring to a mixture of dimethylformamide (10 ml.; dried over molecular sieves) and methylene chloride (30 ml.). The mixture is stirred for a further 15 minutes after the addition is complete. A solution of N-cyclopropylmethyl-7α-(1,1-dimethoxyethyl) - 6,7,8,14 - tetrahydro-6,14-endoethenonorthebaine (1 g.) in methylene chloride (10 ml.) and pyridine (0.5 ml.) is then added in a slow stream, and the mixture is stirred at room temperature for 45 minutes. Aqueous sodium hydroxide (60 ml.; 5%) is then added, and the mixture is stirred vigorously for 30 minutes. The layers are separated and the organic phase is washed with water and dried. The oil obtained by evaporation of solvent is dissolved in dilute hydrochloric acid (5%), and the solution is washed with ether and extracted with methylene chloride. The extract is dried and evaporated. Acetone is added to cause crystallization and the material is colleced with the aid of ether to give N-cyclopropylmethyl-7α-(2-formyl - 1 - methoxyvinyl)- 6,7,8,14 - tetrahydro - 6,14 - endoethenonorthebaine hydrochloride (835 mg.), M.P. 213–215° C.

EXAMPLE 6

Preparation of 7α-(2-formyl-1-methoxyvinyl)-7,8,-dihydro-6-hydroxy-6,14-endoethenocodide Following the general procedure of Example 1, 7α-(1,1-dimethoxyethyl) - 7,8 - dihydro - 6 - hydroxy-6,14-endoethenocodide is treated with phosgene-dimethylformamide followed by hydrolysis to give 7α-(2-formyl-1-methoxyvinyl) - 7,8 - dihydro - 6 - hydroxy-6,14-endoethonocodide.

EXAMPLE 7

Preparation of 7α-(2-formyl-1-methoxyvinyl)-6,7,8,14-tetrahydro-6,14-endoethenooripavine Following the general procedure of Example 5, 7α-(1,1 - dimethoxyethyl) - 6,7,8,14 - tetrahydro-6,14-endoethenooripavine is treated with phosgene-dimethylformamide followed by hydrolysis to give 7α-(2-formyl-1-methoxyvinyl)-6,7,8,14-tetrahydro - 6,14 - endoethenooripavine.

EXAMPLE 8

Preparation of N-cyano-7α-(2-formyl-1-methoxyvinyl)-6,7,8,14-tetrahydro-6,14-endoethenonorthebaine Following the general procedure of Example 1, N-cyano-7α-(1,1 - dimethoxyethyl) - 6,7,8,14 - tetrahydro-6,14-endoethenonorthebaine is treated with phosgene-dimethylformamide followed by hydrolysis to give N-cyano-7α-(2-formyl - 1 - methoxyvinyl) - 6,7,8,14-tetrahydro-6,14-endoethenonorthebaine.

EXAMPLE 9

Preparation of 7α-(2-formyl-1-methoxyvinyl)-6,7,8,14-tetrahydro-6,14-endoethenonorthebaine Following the general procedure of Example 5, 7α-(1,1 - dimethoxyethyl) - 6,7,8,14 - tetrahydro - 6,14-endoethenonorthebaine is treated with phosgene-dimethylformamide followed by hydrolysis to give 7α-(2-formyl-1 - methoxyvinyl) - 6,7,8,14 - tetrahydro - 6,14-endoethenonorthebaine.

EXAMPLE 10

Preparation of N-allyl-7α-(2-formyl-1-methoxyvinyl)-6,7,8,14-tetrahydro-6,14-endoethenonorthebaine Following the general procedure of Example 1, N-allyl-7α - (1,1 - dimethoxyethyl) - 6,7,8,14 - tetrahydro - 6,4-endoethenonorthebaine is treated with phosgene-dimethylformamide followed by hydrolysis to give N-allyl-7α-(2-formyl - 1 - methoxyvinyl) - 6,7,8,14 - tetrahydro - 6,14-endoethenonorthebaine.

EXAMPLE 11

Preparation of 7α-(2-formyl-1-methoxyvinyl)-6,7,8,14-tetrahydro-6,14-endoethenonororipavine Following the general procedure of Example 5, 7α-(1,1 - dimethoxyethyl) - 6,7,8,14 - tetrahydro - 6,14-endoethenonororipavine is treated with phosgene-dimethylformamide followed by hydrolysis to give 7α-(2-formyl - 1 - methoxyvinyl) - 6,7,8,14 - tetrahydro-6,14-endoethenonororipavine.

EXAMPLE 12

Preparation of 3-acetyl-7α-(2-formyl-1-methoxyvinyl)-6,7,8,14-tetrahydro-6,14-endoethenooripavine Following the general procedure of Example 1, 3-acetyl - 7α - (1,1 - dimethoxyethyl) - 6,7,8,14 - tetrahydro-6,14-endoethenooripavine is treated with phosgene-dimethylformamide followed by hydrolysis to give 3-acetyl - 7α - (2 - formyl - 1 - methoxyvinyl) - 6,7,8,14-tetrahydro-6,14-endoethenooripavine.

EXAMPLE 13

Preparation of 7α-(2-formyl-1-methoxyvinyl)-N-propyl-6,7,8,14-tetrahydro-6,14-endoethenonorthebaine Following the general procedure of Example 1, 7α-(1,1 - dimethoxyethyl) - N - propyl - 6,7,8,14 - tetrahydro - 6,14 - endoethenonorthebaine is treated with phosgene-dimethylformamide followed by hydrolysis to give 7α - (2 - formyl - 1 - methoxyvinyl)-N-propyl-6,7,8,14-tetrahydro-6,14-endoethenonorthebaine.

EXAMPLE 14

Preparation of 7α-(2-formyl-1-methoxyvinyl)-N-phenethyl-6,7,8,14-tetrahydro-6,14-endoethenonorthebaine Following the general procedure of Example 1, 7α-(1,1 - dimethoxyethyl) - N - phenethyl - 6,7,8,14-tetrahydro-6,14-endoethenonorthebaine is treated with phosgene-dimethylformamide followed by hydrolysis to give 7α-(2 - formyl - 1 - methoxyvinyl) - N - phenethyl-6,7,8,14-tetrahydro-6,14-endoethenonorthebaine.

EXAMPLE 15

Preparation of 7α(2 - formyl - 1-methoxyvinyl)-N-(3-methyl - 2 - buten - 1 - yl)-6,7,8,14-tetrahydro-6,14-endoethenonorthebaine Following the general procedure of Example 1, 7α-(1,1 - dimethoxyethyl) - N - (3 - methyl-2-buten-1-yl)-6,7,8,14 - tetrahydro - 6,14 - endoethenonorthebaine is treated with phosgene-dimethylformamide followed by hydrolysis to give 7α - (2 - formyl - 1 - methoxyvinyl)-N - (3-methyl-2-buten - 1 - yl)-6,7,8,14-tetrahydro-6,14-endoethenonorthebaine.

EXAMPLE 16

Preparation of 7α(2-formyl-1-methoxyvinyl)-N-propargyl-6,7,8,14-tetrahydro-6,14-endoethenonorthebaine Following the general procedure of Example 1, 7α-(1,1 - dimethoxyethyl) - N - propargyl - 6,7,8,14-tetrahydro-6,14-endoethenonorthebaine is treated with phosgene-dimethylformamide followed by hydroylsis to give 7α - (2 - formyl - 1 - methoxyvinyl) - N - propargyl-6,7,8,14-tetrahydro-6,14-endoethenonorthebaine.

EXAMPLE 17

Preparation of 7α-(2-formyl-1-methoxy-1-butenyl)-6,7,8,14-tetrahydro-6,14-endoethenothebaine Following the general procedure of Example 1, 7α-(1,1 - dimethoxybutyl) - 6,7,8,14 - tetrahydro - 6,14-endoethenothebaine is treated with phosgene-dimethylformamide followed by hydrolysis to give 7α-(2-formyl-1-methoxy - 1 - butenyl) - 6,7,8,14 - tetrahydro - 6,14-endoethenothebaine.

EXAMPLE 18

Preparation of 7α-(2-formyl-1-methoxyvinyl)-6,7,8,14-tetrahydro-6,14-endoethanothebaine Following the general procedure of Example 1, 7α-(1,1 - dimethoxyethyl) - 6,7,8,14 - tetrahydro - 6,14-endoethenothebaine is treated with phosgene-dimethylformamide followed by hydrolysis to give 7α-(2-formyl-1 - methoxyvinyl) - 6,7,8,14 - tetrahydro-6,14 - endoethanothebaine.

EXAMPLE 19

Preparation of 7α-(2-formyl-1-propoxyvinyl)-6,7,8,14-tetrahydro-6,14-endoethenothebaine Following the general procedure of Example 1, 7α-(1,1 - dipropoxyethyl) - 6,7,8,14 - tetrahydro - 6,14 - endoethenothebaine is treated with phosgene-dimethylformamide followed by hydrolysis to give 7α-(2-formyl-1-propoxyvinyl) - 6,7,8,14 - tetrahydro - 6,14 - endoethenothebaine.

EXAMPLE 20

Preparation of 7β-(2-formyl-1-methoxyvinyl)-6,7,8,14-tetrahydro-6,14-endoethenothebaine Following the general procedure of Example 1, 7β-(1,1 - dimethoxyethyl) - 6,7,8,14 - tetrahydro - 6,14 - endoethenothebaine is treated with phosgene-dimethylformamide followed by hydrolysis to give 7β-(2-formyl-1 - methoxyvinyl) - 6,7,8,14 - tetrahydro - 6,14 - endoethenothebaine.

EXAMPLE 21

Preparation of N - cyclopropylmethyl - 7α-(2-formyl-1-methoxyvinyl) - 6,7,8,14 - tetrahydro - 6,14 - endoethenonororipavine Following the general procedure of Example 5, N-cyclopropylmethyl - 7α - (1,1 - dimethoxyethyl)-6,7,8,14-tetrahydro - 6,14-endoethenonororipavine is treated with phosgene-dimethylformamide followed by hydrolysis to give N - cyclopropylmethyl - 7α - (2 - formyl-1-methoxyvinyl)-6,7,8,14-tetrahydro-6,14-endoethenonororipavine.

We claim:

1. A compound selected from the group consisting of those of the formula:

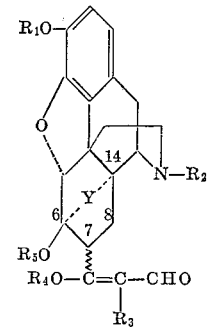

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; $R_3$ is selected from the group consisting of hydrogen and alkyl of from 1 to 7 carbon atoms; $R_4$ is a lower alkyl; $R_5$ is selected from the group consisting of hydrogen and methyl; and Y is selected from the group consisting of etheno and ethano; the acid-addition salts thereof; and the alkali-metal phenolates thereof when $R_1$ is hydrogen.

2. A compound according to claim 1 wherein $R_1$, $R_2$, $R_4$ and $R_5$ are methyl; $R_3$ is hydrogen; Y is etheno; and the configuration at the 7-position is alpha.

3. A compound according to claim 1 wherein $R_1$, $R_4$ and $R_5$ are methyl; $R_2$ is cyclopropylmethyl; $R_3$ is hydrogen; Y is etheno; and the configuration at the 7-position is alpha.

4. A compound according to claim 1 wherein $R_1$ and $R_3$ are hydrogen; $R_2$, $R_4$ and $R_5$ are methyl; Y is etheno; and the configuration at the 7-position is alpha.

5. A compound according to claim 1 wherein $R_1$ and $R_3$ are hydrogen; $R_2$ is cyclopropylmethyl; $R_4$ and $R_5$ are methyl; Y is etheno; and the configuration at the 7-position is alpha.

6. A compound according to claim 1 wherein $R_1$, $R_4$ and $R_5$ are methyl; $R_2$ and $R_3$ are hydrogen; Y is etheno; and the configuration at the 7-position is alpha.

7. A compound according to claim 1 wherein $R_1$, $R_2$ and $R_3$ are hydrogen; $R_4$ and $R_5$ are methyl; Y is etheno; and the configuration at the 7-position is alpha.

8. A compound according to claim 1 wherein $R_1$ is methyl; $R_2$ is allyl; $R_3$ is hydrogen; $R_4$ and $R_5$ are methyl; Y is etheno; and the configuration at the 7-position is alpha.

9. A compound according to claim 1 wherein $R_1$ is methyl; $R_2$ is 3-methyl-2-buten-1-yl; $R_3$ is hydrogen; $R_4$ and $R_5$ are methyl; Y is etheno; and the configuration at the 7-position is alpha.

10. The process of preparing compounds of the formula:

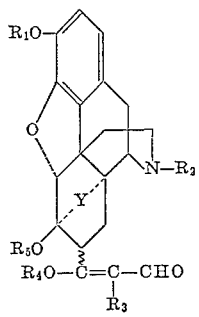

wherein $R_1$ is selected from the group consisting of hydrogen, lower alkyl and lower alkanoyl, $R_2$ is selected from the group consisting of hydrogen, cyano, propargyl, lower alkyl, phenyl lower alkyl, lower alkenyl and lower cycloalkylmethyl, $R_3$ is selected from the group consisting of hydrogen and alkyl of from 1 to 7 carbon atoms, $R_4$ is lower alkyl, $R_5$ is selected from the group consisting of hydrogen and methyl, and Y is selected from the group consisting of etheno and ethano; which comprises contacting a compound of the formula:

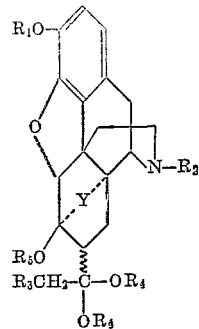

wherein $R_1$, $R_2$, $R_3$, $R_4$, $R_5$ and Y are as hereinabove defined with a formylating reagent of the formula:

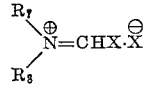

wherein X is selected from the group consisting of Cl and Br, $R_7$ and $R_8$ when taken separately are each selected from the group consisting of phenyl and lower alkyl, and $R_7$ and $R_8$ when taken together with the nitrogen atom to which they are attached form a heterocyclic ring selected from the group consisting of piperidinyl and morpholinyl; hydrolyzing the iminium intermediate thus obtained; and recovering the formed product from the reaction mixture.

References Cited

UNITED STATES PATENTS

| | | | |
|---|---|---|---|
| 3,285,914 | 11/1966 | Gordon | 260—285 |
| 3,329,682 | 7/1967 | Bentley | 260—285 |

FOREIGN PATENTS

| | | |
|---|---|---|
| 969,263 | 9/1964 | Great Britain. |
| 937,214 | 9/1963 | Great Britain. |

OTHER REFERENCES

Bentley et al., Jour. Am. Chem. Soc., vol. 89, pp. 3273–80 (1967).

DONALD G. DAUS, Primary Examiner

U.S. Cl. X.R.

424—260; 260—247.2, 294, 544, 562

PO-1050
(5/69)

UNITED STATES PATENT OFFICE
CERTIFICATE OF CORRECTION

Patent No. 3,474,102    Dated October 21, 1969

Inventor(s) John Johnston Brown and Robert Allis Hardy, Jr.

It is certified that error appears in the above-identified patent and that said Letters Patent are hereby corrected as shown below:

Column 2, lines 48-50, that portion of formula (I) reading $R_4O-\overset{\xi}{C}=CHO$ should read $R_4O-\overset{\xi}{C}=C-CHO$
$\phantom{R_4O-C=CHO\;\;\;\;\;\;\;\;\;\;\;\;\;}|\phantom{\;\;\;\;\;\;\;\;\;\;\;\;\;\;\;\;\;\;\;\;\;\;\;\;\;\;\;\;}|$
$\phantom{R_4O-C=CHO\;\;\;\;\;\;\;\;\;\;\;\;}R_3\phantom{\;\;\;\;\;\;\;\;\;\;\;\;\;\;\;\;\;\;\;\;\;\;\;\;\;}R_3$ Column 4, line 56, "or" should read -- for --. Column 5, line 74, "colleced" should read -- collected --. Column 6, line 12, "ethonocodide" should read -- ethenocodide --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents